United States Patent
Hart et al.

(10) Patent No.: US 8,322,513 B2
(45) Date of Patent: Dec. 4, 2012

(54) APPARATUS AND METHOD FOR LOADING FOOD ARTICLES

(75) Inventors: Colin R. Hart, Ankeny, IA (US); Paul J. Joynt, Ankeny, IA (US); David W. Braner, Polk City, IA (US); Joshua W. Higgins, Pleasant Hill, IA (US); David W. Alexander, Boone, IA (US)

(73) Assignee: F.R. Drake Company, Waynesboro, VA (US)

( * ) Notice: Subject to any disclaimer, the term of this patent is extended or adjusted under 35 U.S.C. 154(b) by 0 days.

(21) Appl. No.: 13/226,030

(22) Filed: Sep. 6, 2011

(65) Prior Publication Data

US 2011/0315515 A1 Dec. 29, 2011

Related U.S. Application Data

(63) Continuation of application No. 12/849,129, filed on Aug. 3, 2010, now Pat. No. 8,011,494, which is a continuation of application No. 12/477,763, filed on Jun. 3, 2009, now Pat. No. 7,766,154, which is a continuation of application No. 11/162,172, filed on Aug. 31, 2005, now Pat. No. 7,581,634.

(51) Int. Cl.
*B65G 47/08* (2006.01)
(52) U.S. Cl. ............... 198/418.6; 198/429; 198/431; 198/531
(58) Field of Classification Search ............... 198/418.6, 198/426, 429, 431, 531
See application file for complete search history.

(56) References Cited

U.S. PATENT DOCUMENTS

| 4,386,490 | A | * | 6/1983 | Griffith et al. ................. 53/148 |
| 4,733,518 | A | * | 3/1988 | Griesdorn ....................... 53/444 |
| 5,232,080 | A | * | 8/1993 | van Essen et al. ......... 198/418.6 |
| 5,325,653 | A | * | 7/1994 | Boyd .............................. 53/248 |
| 5,388,385 | A | * | 2/1995 | Phelps et al. ................... 53/247 |
| 5,427,226 | A | * | 6/1995 | Ueda et al. ................. 198/418.6 |
| 5,720,149 | A | * | 2/1998 | Stimpfl .......................... 53/244 |
| 5,779,432 | A | * | 7/1998 | Pena .......................... 414/794.4 |
| 6,141,943 | A | * | 11/2000 | Hart et al. ....................... 53/444 |
| 6,554,126 | B1 | * | 4/2003 | Muller ....................... 198/465.1 |
| 6,843,359 | B2 | * | 1/2005 | Ballestrazzi et al. ...... 198/418.6 |
| 7,080,968 | B2 | * | 7/2006 | Blackwell et al. ......... 414/798.9 |
| 7,185,753 | B2 | * | 3/2007 | Hartness et al. ........... 198/474.1 |

(Continued)

FOREIGN PATENT DOCUMENTS

| JP | 54-49772 A | 4/1979 |
| JP | 63-178911 U | 7/1988 |
| JP | 64-7121 U | 1/1989 |
| JP | 64-48182 U | 3/1989 |

*Primary Examiner* — Douglas Hess
(74) *Attorney, Agent, or Firm* — Berenato & White, LLC

(57) ABSTRACT

A loading head for use with food articles has a main conveyor adapted to convey a plurality of food articles, an indexing conveyor positioned beneath the main conveyor, and a transfer member positioned between the main conveyor and the indexing conveyor. The transfer member is adapted to transfer each food article from the main conveyor to the indexing conveyor. A buffering mechanism is adapted to move the transfer member between a first position and a variable second position. A pusher mechanism is associated with the indexing conveyor to raise and lower gates from an open position permitting food article transfer to a closed position prohibiting food article transfer. The pusher mechanism includes a cam operably associated with the gates to open and close the gates.

20 Claims, 8 Drawing Sheets

U.S. PATENT DOCUMENTS

| | | | |
|---|---|---|---|
| 7,191,893 B2 * | 3/2007 | Maldina et al. | 198/418.6 |
| 7,581,634 B2 * | 9/2009 | Hart et al. | 198/418.6 |
| 7,686,153 B2 * | 3/2010 | Tsai | 198/347.1 |
| 7,766,154 B2 * | 8/2010 | Hart et al. | 198/418.6 |
| 7,797,909 B2 * | 9/2010 | Ream et al. | 53/54 |
| 8,011,494 B2 * | 9/2011 | Hart et al. | 198/418.6 |

* cited by examiner

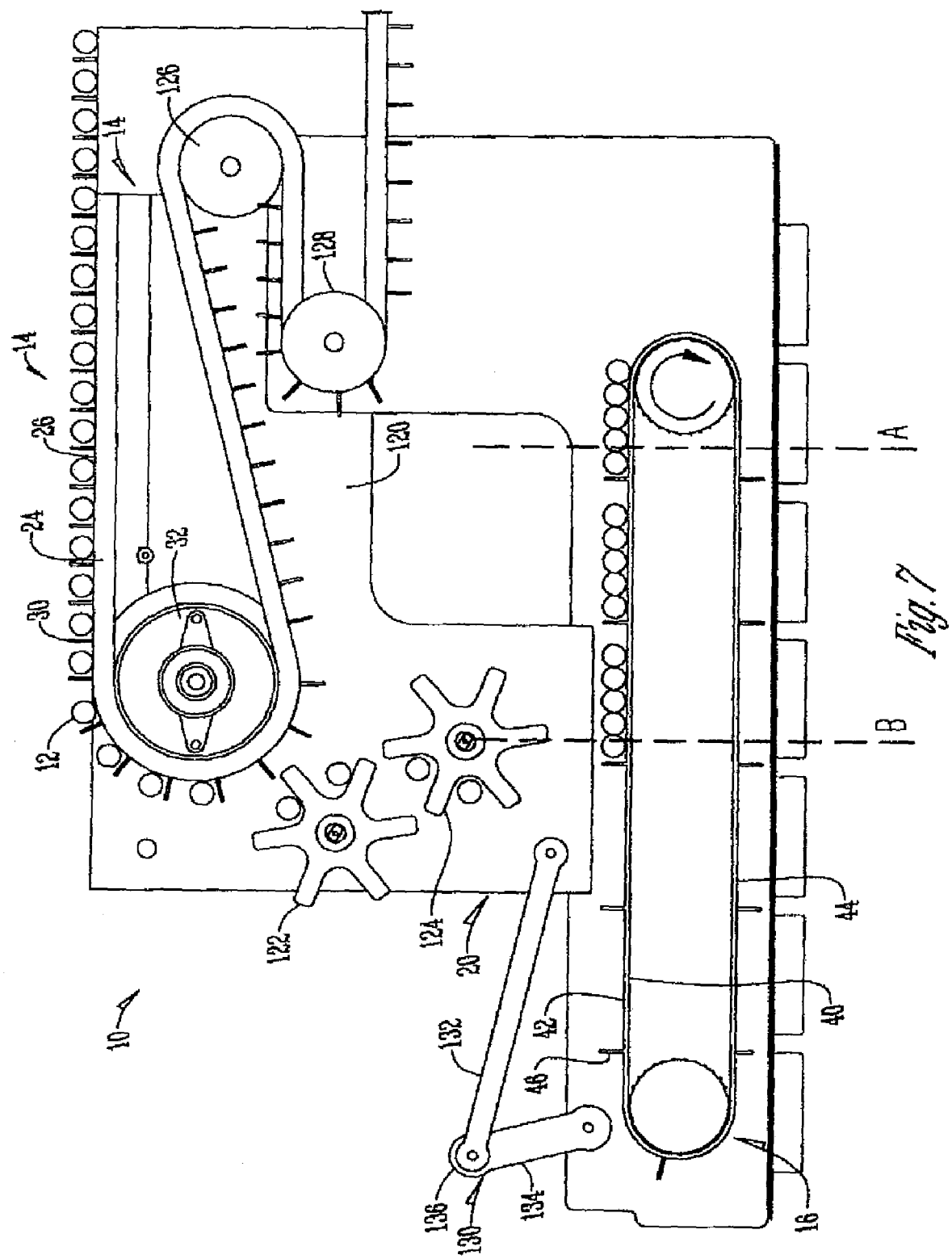

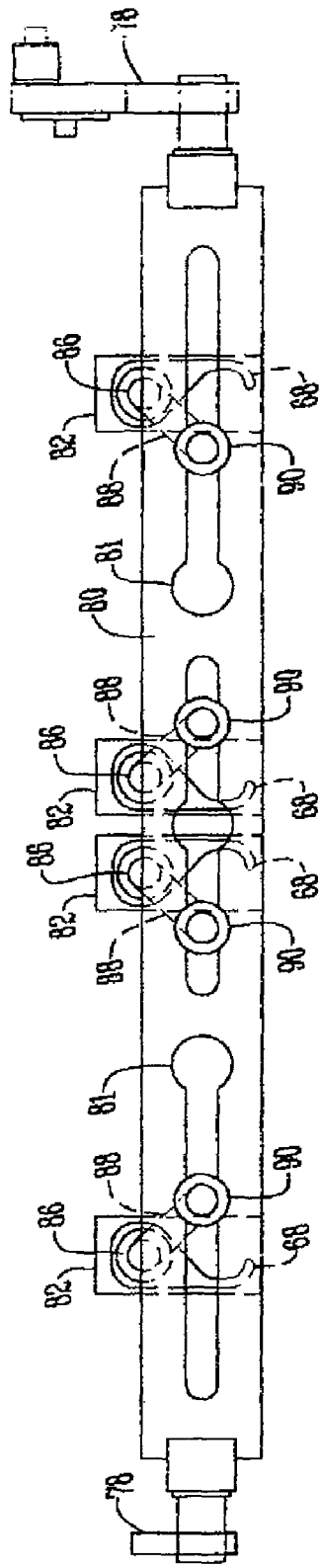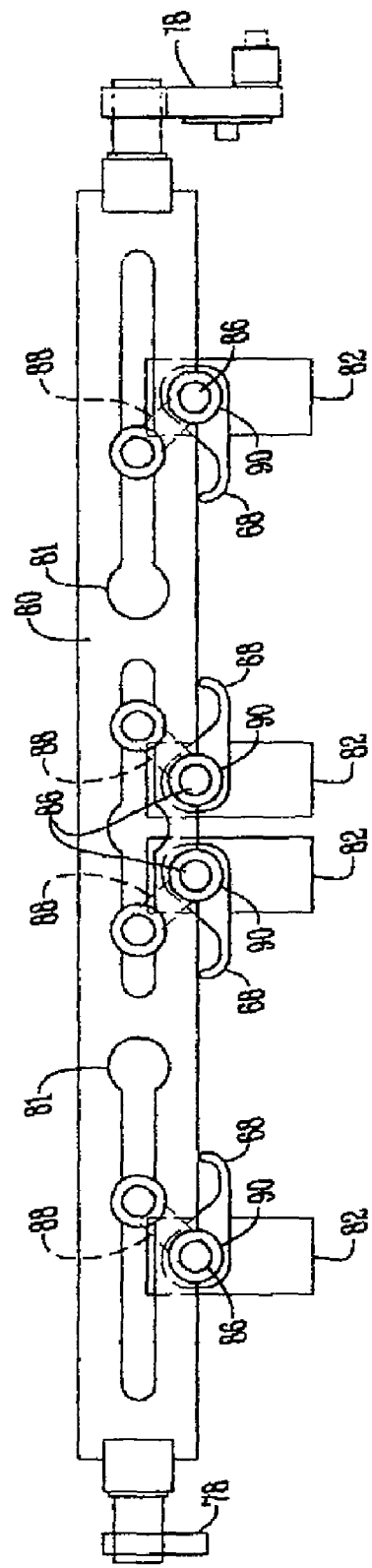

APPARATUS AND METHOD FOR LOADING FOOD ARTICLES

CROSS REFERENCE TO A RELATED APPLICATION

This application is a continuation of application Ser. No. 12/849,129, filed Aug. 3, 2010, now U.S. Pat. No. 8,011,494, which is a continuation of application Ser. No. 12/477,763, filed Jun. 3, 2009, now U.S. Pat. No. 7,766,154, which is a continuation of U.S. Ser. No. 11/162,172 filed Aug. 31, 2005, now U.S. Pat. No. 7,581,634.

BACKGROUND OF THE INVENTION

This invention relates to loading heads for food articles such as sausages or franks. More particularly, this invention relates to a loading head device having a variable capacity buffer mechanism to compensate for the intermittent motion of an indexing conveyor.

Food articles such as sausages, franks, and the like are packaged after manufacture. This packaging is typically accomplished with a loading head which transfers these food articles into packaging trays positioned beneath the loading head.

To accomplish loading into packaging trays, some transfer conveyors of the loading head operate at various speeds. To increase productivity, food articles are typically continuously deposited onto the transfer conveyor regardless of its operating condition (i.e., running or stopped). U.S. Pat. No. 6,141,943 to Hart et al. accomplishes this continuous depositing of food articles on a transfer conveyor which oscillates back and forth with respect to the other portions of the loading head. While these styles of loading heads have solved some of the problems, other problems still remain. For example, the optimum rate at which food articles are packaged is limited primarily because the oscillation of the transfer conveyor has a fixed travel distance. Also, because of the manner in which the food articles are handled, the product is susceptible to damage. In addition, hinged gates mounted below the transfer conveyor typically utilize torsion springs to close the gates. These torsion springs frequently break and pieces may fall into the packaging. Accordingly, there is a need in the art for a new food article loading head.

It is therefore a principal object of the invention to provide a loading head that optimizes the processing rate for packaging food articles.

Another object of the invention is to provide a loading head that reduces the possibility of product damage.

A further objective of the invention is to provide a linkage system to control the operation of the hinge gates that is less susceptible to breakage.

These and other objectives will be apparent to those skilled in the art.

BRIEF SUMMARY OF THE INVENTION

A loading head for use with food articles has a main conveyor adapted to convey a plurality of food articles, an indexing conveyor positioned beneath the main conveyor, and a transfer member positioned between the main conveyor and the indexing conveyor. The transfer member is adapted to transfer each food article from the main conveyor to the indexing conveyor. A positioning member is associated with the transfer member, where the positioning member is adapted to move the transfer member between a first position and a variable second position.

Also disclosed is a linkage system for use with a packaging machine to deposit food articles therein. The linkage system is associated with a pusher mechanism to operate the hinge gates from an open position permitting food article transfer to a closed position prohibiting food article transfer. The linkage system includes a motorized cam mechanism operably associated with the hinged gates to lift the hinged gates into a closed position.

BRIEF DESCRIPTION OF THE DRAWINGS

FIG. 7 is a side view of another embodiment of a loading head;

FIG. 8 is an end view of a linkage system in an open position; and

FIG. 9 is an end view of a linkage system in a closed position.

DESCRIPTION OF THE PREFERRED EMBODIMENTS OF THE INVENTION

Figure 1:
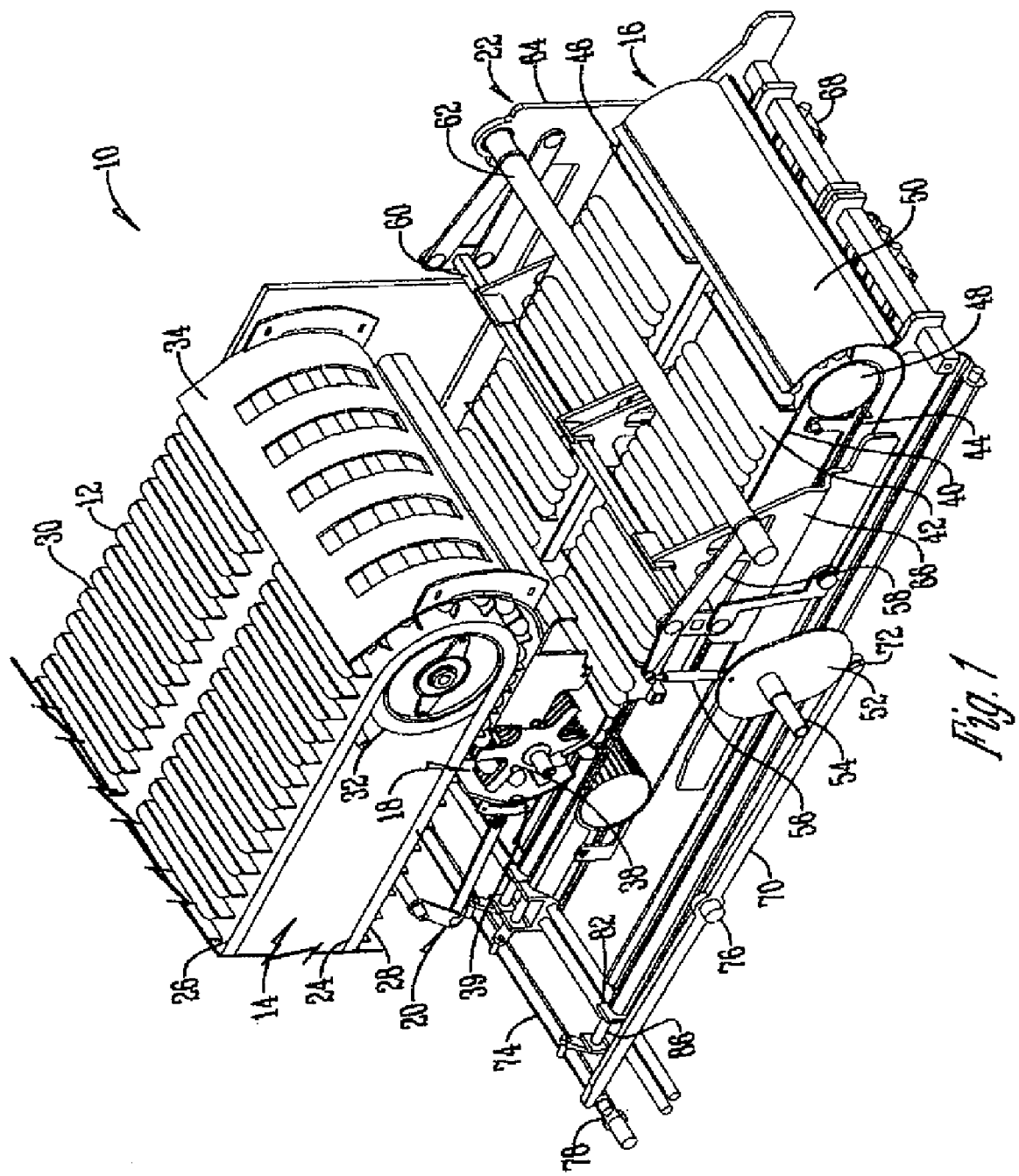
FIG. 1 is perspective view of a loading head and linkage system.

Referring to the Figures, a loading head 10 is used in the transferring of formed food articles 12 from a food manufacturing machine (not shown) to a packaging machine (not shown). In general, the loading head 10 includes a main conveyor 14 adapted to convey food away from food manufacturing equipment, and an indexing conveyor 16 positioned beneath the main conveyor 14 for conveying food articles 12 from the main conveyor 14 to a packaging machine (not shown). A transfer member or wheel 18 is positioned between the main conveyor 14 and the indexing conveyor 16. The transfer wheel 18 is adapted to transfer each food article 12 from the main conveyor 14 to the indexing conveyor 16. A variable capacity buffer mechanism 20 is associated with the transfer member 18. The buffer mechanism 20 is adapted to move the transfer member 18 between a first position and a variable second position. (See FIGS. 3 and 4). This oscillation of the transfer member 18 by the buffer mechanism 20 allows the main conveyor 14 to operate at a continuous speed while the indexing conveyor 16 operates with an intermittent motion. Mounted to the loading head 10 is a pusher mechanism 22 which intermittently deposits food articles 12 from the indexing conveyor 16, to the packaging machine (not shown).

More specifically, the main conveyor 14 includes a continuous conveyor belt 24 with an upper surface 26 and a lower surface 28. Flights 30 extend from the surface of the conveyor belt 24 to receive food articles 12 therein. Flights 30 may be sized so there is a one to one flight per food article ratio; however, the flights may be spaced to accommodate a plurality of food articles or to accommodate food articles of varying size. The conveyor belt 24 rotatably extends around sprocket 32. An end turn 34 is positioned in spaced arrangement to the sprocket 32 and is oriented and arranged to permit the conveyor belt 24 to pass between the sprocket 32 and end turn 34 such that end turn 34 retains the food articles 12 on the conveyor belt 24.

A transfer wheel 18 receives each food article 12 exiting from the main conveyor 14. Pockets 38 on the transfer wheel 18 receive each food article 12, where preferably there is a one to one ratio between the pockets 38 and the flights 30; however, other ratios may be used without departing from the present invention. A second end turn 39 is positioned in spaced alignment to the transfer wheel 18 to prevent food articles 12 from exiting pockets 38. The transfer wheel 18 rotates to deposit each food article 12 on to the indexing conveyor 16.

An indexing belt 40 on the indexing conveyor 16 is positioned beneath the main conveyor 14 to receive each food article 12 from the transfer wheel 18. The indexing belt 40 moves at a varying speed, starting and stopping to deposit food articles 12 in a packaging machine (not shown). The indexing belt 40 includes a top surface 42 which receives each food article 12 from the transfer wheel 18 and a bottom surface 44 which deposits each food article 12 from the indexing conveyor 16 to the packaging machine (not shown). Separating or grouping flights 46 hold several food articles 12 on the indexing belt 40; however, there may be a one to one ratio between the separating flights 46 and the food articles 12 without departing from the present invention. The indexing belt 40 rotatably extends around pulley 48. An end turn 50 is positioned in spaced alignment to the pulley 48 to retain food articles 12 within separating flight 46 as the indexing belt 40 rotates about pulley 48.

The pushing mechanism 22 is associated with hinge gates 68 adjacent the bottom surface 44 of the indexing belt 40 to periodically retain food articles 12 on the bottom surface 44 of indexing conveyor 16. The pusher mechanism 22 has a cam 52 that is rotatably mounted to a drive shaft 54. A link 56 is connected to the cam 52 at one end and to a lever 58 at the opposite end. The lever 58 is pivotably mounted to a support bar 60 at one end and is rotatably connected to a cross bar 62 at the opposite end. Cross bar 62 is connected to and extends between frame 64. Connected to the support bar 60 are a plurality of pusher bars 66. The pusher bars 66 are positioned above a plurality of gates 68.

The gates 68 are connected to the cam 52 as part of the pusher mechanism 22. More specifically, a lever 70 has a cam follower 72 at one end that engages cam 52, and is connected to a lift bar 74 at the opposite end. The lever 70 is mounted to and pivots about a pivot pin 76.

The lever 70 is connected by links 78 to lift bar 74. The links 78 are rotatably connected to the lift bar 74 at both ends.

A plurality of lift blocks 82 are slidably mounted on support bars 84 that extend between and are connected to the frame 64. The blocks 82 have a rotatable shaft 86 that extends therethrough with crank arms 88 connected to one end of the shaft 86. The crank arms 88 are engaged by lift bar 74 to raise gates 68 from a lowered position. The shaft 86 extends through block 82 and is connected to the gate 68 at the end opposite the crank arm 88.

Alternatively, as shown in FIGS. 4, 5, 8, and 9, lever 70 is connected to a lift plate 80 having a plurality of slots 81. The crank arms 88 have bushings 90 that are received within slots 81. In this embodiment, the pusher mechanism 22 both lowers and raises gates 68.

Figure 2:
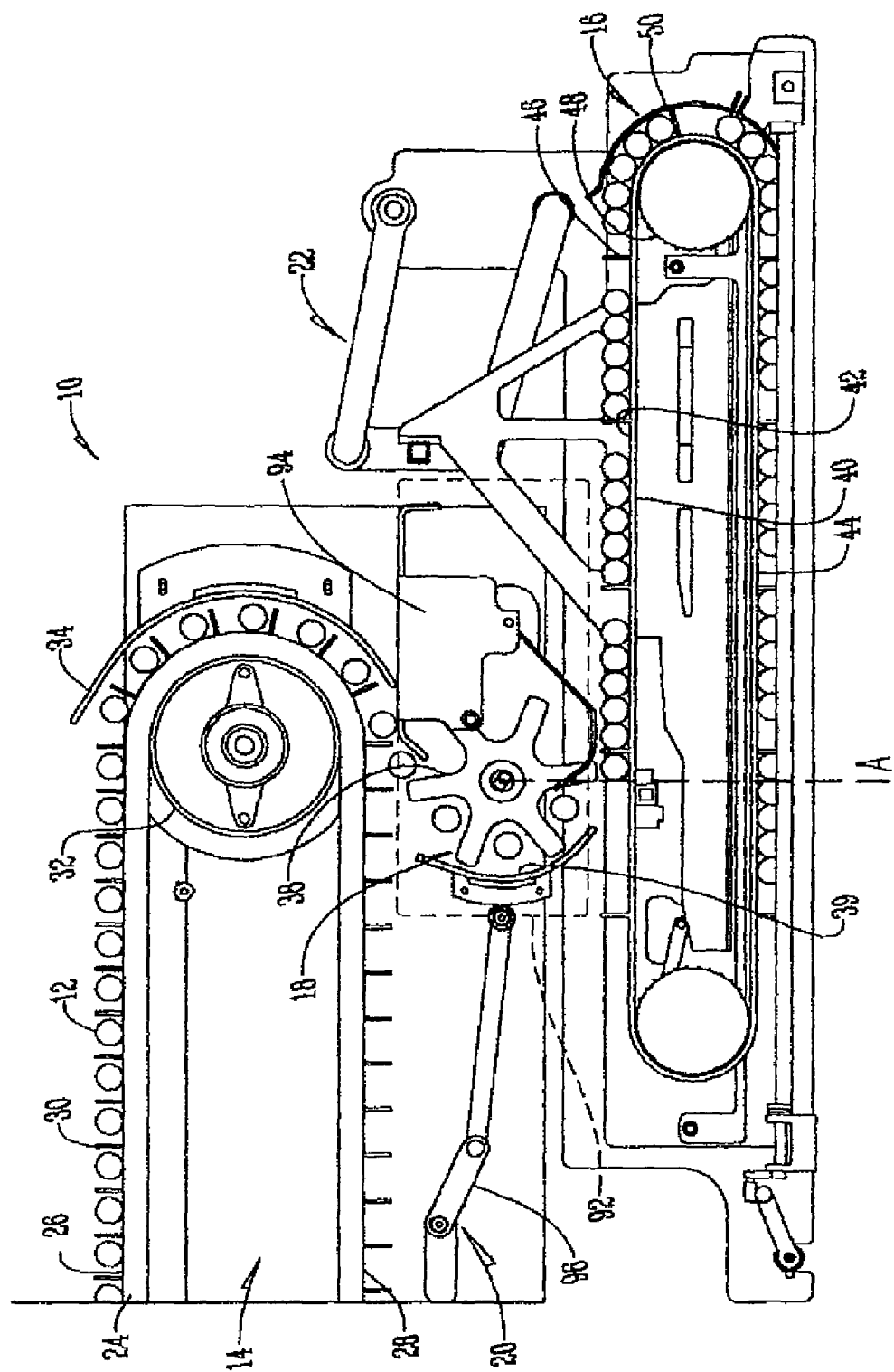
FIG. 2 is a side view of a loading head and linkage system showing the buffer zone decreasing.
Figure 3:
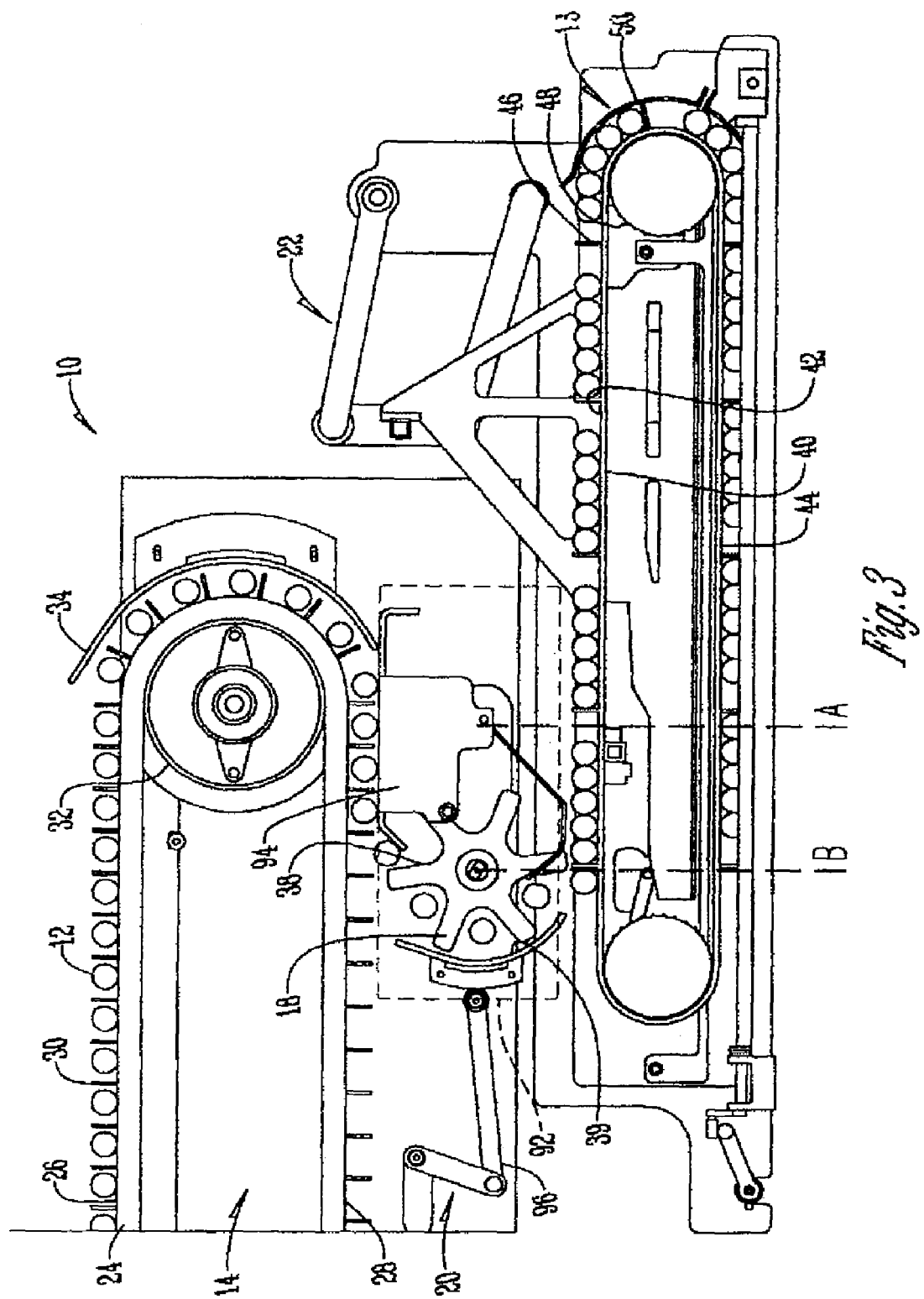
FIG. 3 is a side view of a loading head and linkage system showing the buffer zone filled.

Referring to FIGS. 2 and 3, the buffer mechanism 20 discussed above includes a buffer carriage 92 secured to the transfer wheel 18. Specifically, the buffer carriage 92 is secured to the axis of the transfer wheel 18 so that the transfer wheel 18 can rotate with respect to the buffer carriage 92. An apron shelf 94 is attached to the buffer carriage 92 and positioned upstream of the transfer wheel 18 beneath the sprocket 32 of the main conveyor 14. The apron shelf 94 is adapted to retain food articles 12 on the lower surface 28 of the conveyor belt 24 by covering a variable number of main flights 30. A positioning link 96 is associated with the transfer wheel 18. The positioning link 96 is adapted to oscillate the transfer wheel 18 between a first position A and a variable second position B. As shown, the positioning link 96 is connected to the transfer wheel 18 through the buffer carriage 92. The positioning link 96 may be formed with a mechanical hinged arm driven by a servo drive (not shown), or other suitable mechanisms.

Alternatively, the buffer mechanism 20 is attached to the indexing conveyor 16 to oscillate the indexing conveyor between a first position A and a variable second position.

Figure 6:
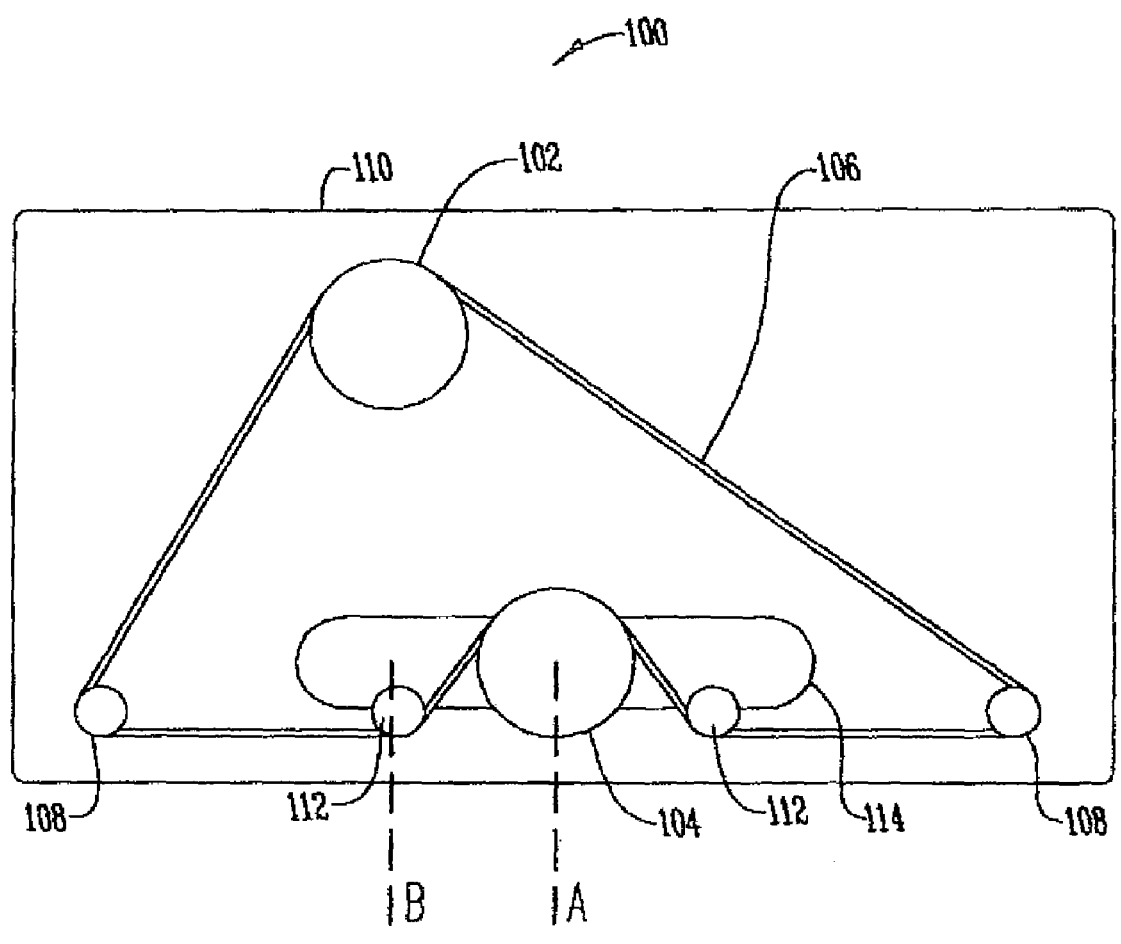
FIG. 6 is a side view of a timing mechanism portion of the loading head and linkage system of FIG. 4.

Referring to FIG. 6, a timing mechanism 100 is associated between the main conveyor 14 and the transfer wheel 18 so that the operation speed of the transfer wheel 18 corresponds with the operating speed of the main conveyor 14. Specifically, pulley 102 is secured to sprocket 32 to rotate in conjunction with the sprocket 32. Likewise, a pulley 104 is connected to transfer wheel 18 to rotate in conjunction with the transfer wheel 18. A timing belt 106 drivingly engages pulley 102 and pulley 104 so that the timing of the pulley 104 is conjoined with the pulley 102. Timing belt 106 is further secured by fixed pulleys 108 extending rotatably from frame 110 and tension pulleys 112 positioned on either side of pulley 104 within a slot 114 formed in frame 110. During operation, as pulley 104 moves from position A to variable position B in correspondence with transfer wheel 18, the pulley 104 and tension pulleys 112 move along slot 114. As pulley 104 moves from position A to variable position B, its position with respect to pulley 102 changes, however, timing belt 106 remains drivingly engaged to both pulley 102 and pulley 104 regardless of position.

In operation, the relationship of the speed of the main conveyor 14 to the indexing conveyor 16 is determined by the spacing between the flights 30 on the main conveyor 14 and the desired spacing between the food articles 12 placed onto on the indexing conveyor 16. For example, if the spacing between flights 30 and food articles 12 are equal, then the speed of the indexing conveyor 16 will be set to equal the speed of the main conveyor 14. If the spacing between food articles 12 is less than the spacing of flights 30, then the speed of the indexing conveyor 14 will be set at a slower rate than the main conveyor 14. The rotational speed of both the main conveyor 14 and the indexing conveyor 16 at this initial setting, taking into account the spacing between flights 30 and food articles 12 on the indexing conveyor 16 is defined as the synchronous speed.

Figure 4:
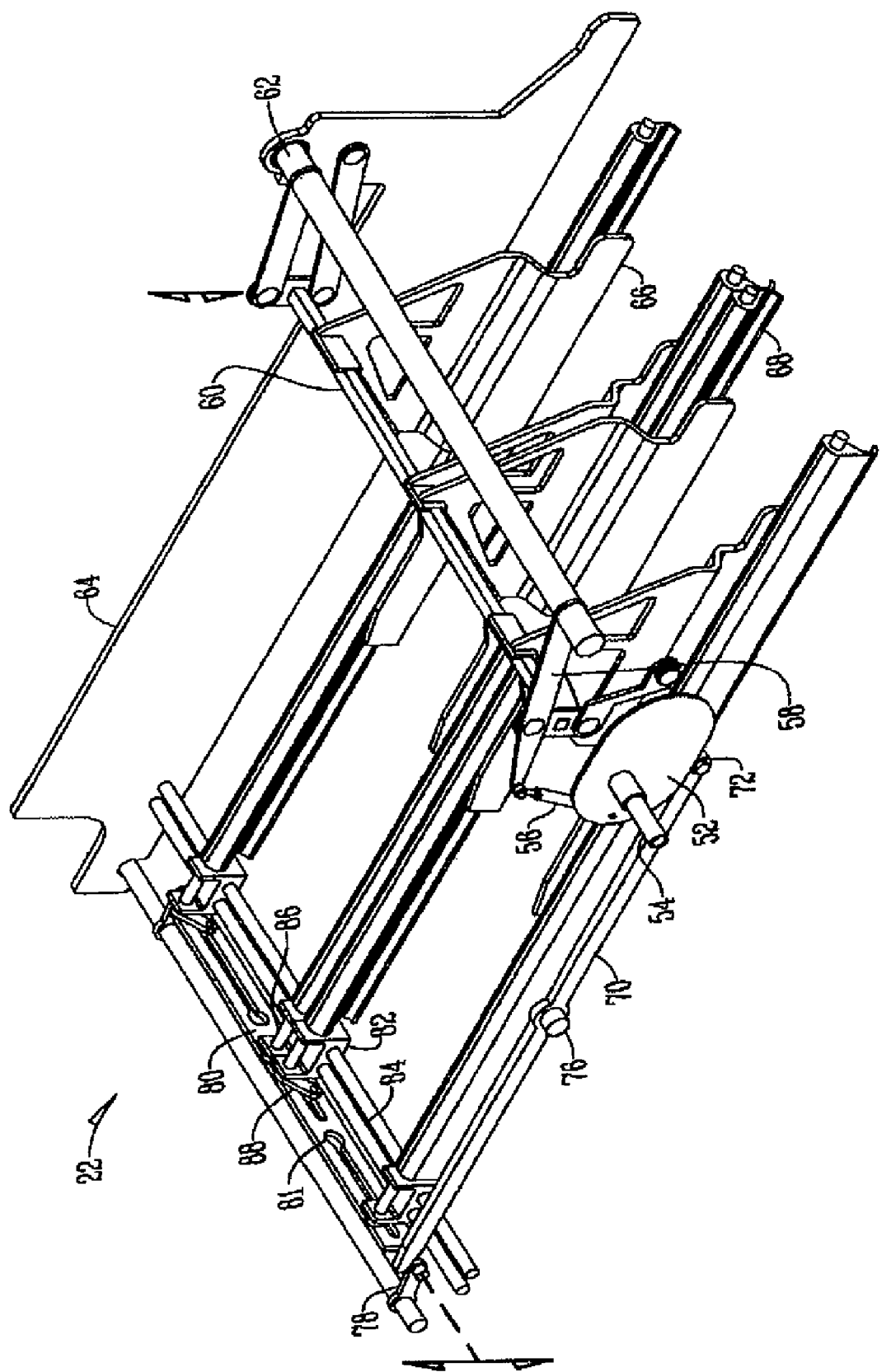
FIG. 4 is a perspective view of a linkage system for a loading head in an open position.
Figure 5:
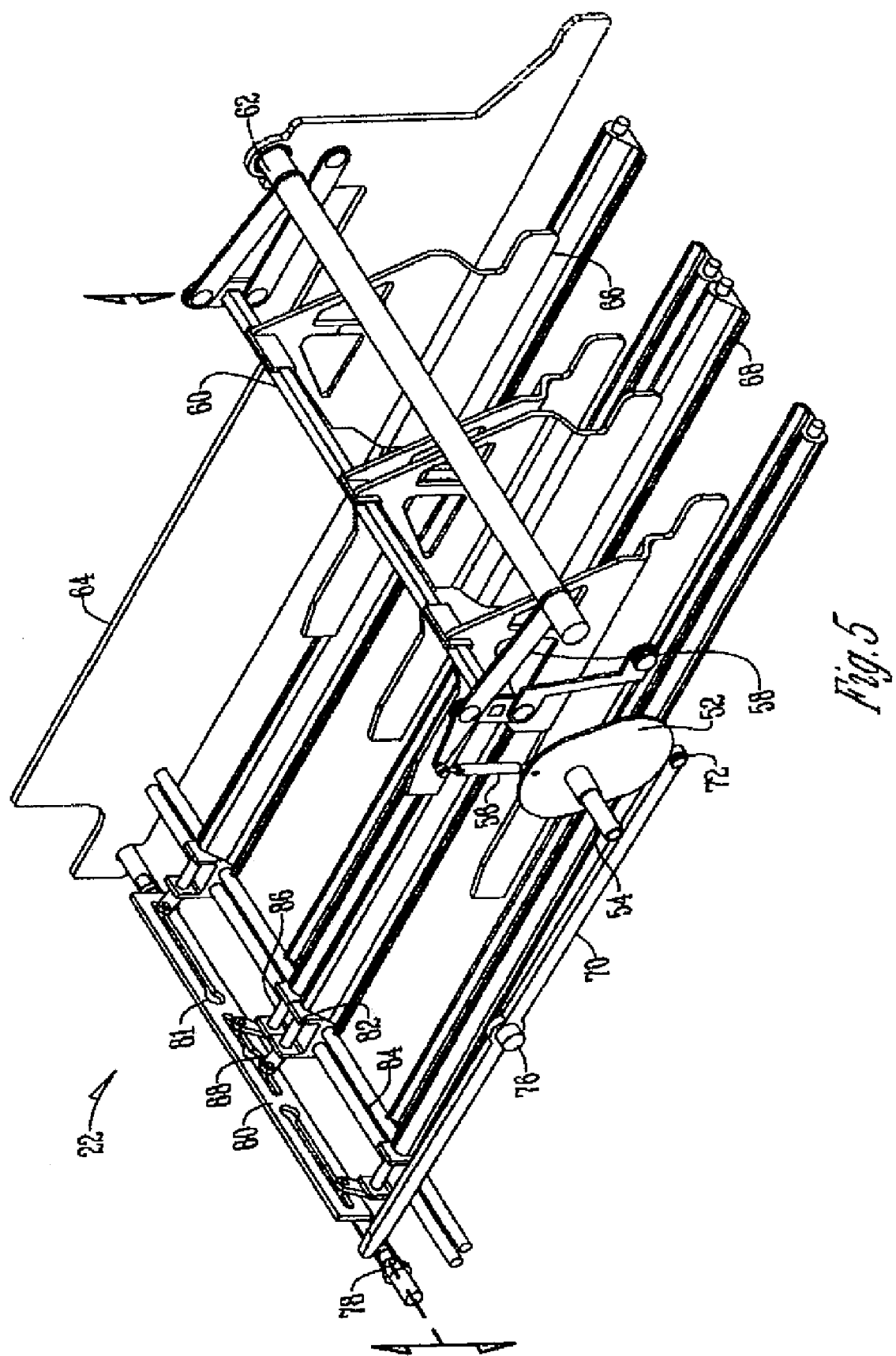
FIG. 5 is a perspective view of a linkage system for a loading head in a closed position.

As the main conveyor 14 begins to rotate, food articles 12 are transferred from the main conveyor 14 via the transfer wheel 18 to the indexing conveyor 16. As the indexing conveyor 16 slows to a speed below its synchronous rate, the buffer mechanism 20 begins to move from position A toward variable position B. As this occurs, food articles are deposited on the apron shelf 94 creating a first buffer zone and on the top surface 42 of the indexing belt 40 creating a second buffer zone. When the indexing conveyor 16 stops, the buffer mechanism 20 continues to move toward variable position B at a constant rate. When the indexing conveyor is stopped, the pusher mechanism 22 lowers pusher bars 66 to push food articles toward the packaging machine (not shown) which opens gates 68. Alternatively, the pusher mechanism 22 mechanically opens gates 68 via the lift plate 80. More specifically, cam 52 is rotated by drive shaft 54. As cam 52 rotates, link 56 which is connected to cam 52 pulls lever 58 such that the lever 58 rotates about cross bar 62 which lowers the support bar 60. As the support bar 60 is lowered, the pusher bars are lowered pushing the food articles 12 through gates 68 which are now opened (FIG. 4). As the cam 52 continues to rotate, link 56 will lift lever 58 which in turn will raise the support bar 60 and pusher bars 66. As the pusher bars 66 are lowered and then raised by the pusher mechanism 22, cam follower 72 also rotates about cam 52. As cam follower rotates about cam 52, lever 70 pivots about pivot pin 76 to lower and then raise lift bar 74. As lifted bar 74 is lowered and then raised, lift bar 74 engages crank arms 88 which rotate about shaft 86. As the crank arms 88 rotate shaft 86 at one end, the gates 68 likewise rotate from a lowered position and back to the original raised position. Once food articles 12 are pushed through gates 68, the gates are raised either by lift bar 74 engaging crank arms 88 or by the raising of lift plate 80, both via the mechanical arrangement of the pusher mechanism 22.

Once the product is pushed through gates 68, the indexing conveyor 16 starts and as it accelerates, the buffer mechanism 20 begins to decelerate from its constant speed as it moves toward variable position B. When the indexing conveyor 16 reaches its synchronous speed, the buffer mechanism 20 comes to a stop at variable position B. Thus, position B is not a fixed position and rather is determined by the synchronous speed of the indexing conveyor 16 as determined by the speed of the main conveyor 14 and the spacing of the flights 30 and food articles 12 or indexing conveyor 16.

As the speed of the indexing conveyor 16 increases above the synchronous rate, the buffer mechanism 20 changes direction and moves from variable position B toward position A. The buffer mechanism 20 will continue to move in the direction of position A until the indexing conveyor 16 decelerates to its synchronous speed. When this occurs, the buffer mechanism 20 stops at position A and changes directions toward variable position B as the speed of the indexing conveyor 16 falls below its synchronous speed. At this point, the process repeats.

Alternatively, lift plate 80 is first lowered via lever 70 to open gates 68 and then raised to close gates 68. As lift plate 80 is lowered (FIG. 8) and raised (FIG. 9), bushings 90 rotate the crank arms 88 which in turn rotate shaft 86 which lower and raise gates 68.

With reference to FIG. 7, another embodiment of the loading head is shown. The loading head 10 has a variable capacity buffer mechanism 20 having a moveable carriage 120. Mounted to the carriage is sprocket 32, a pair of transfer wheels 122 and 124, and a reversing roller 126. Transfer wheel 122 is positioned to receive food articles 12 from the main conveyor 14, and transfer wheel 124 is positioned to receive food articles 12 from transfer wheel 122 and deposit food articles on the indexing conveyor 16.

A continuous belt 24 having a plurality of flights 30 is included in the main conveyor 14 and extends around sprocket 32, reversing roller 126, and fixed sprocket 128. A linkage system 130 is connected to carriage 120 and is adapted to oscillate the position of the carriage 120, and in turn sprocket 32, transfer wheels 122 and 124, and reversing roller 126, between a position A and a variable position B using a servo drive (not shown) or other suitable mechanism. The linkage system 130 preferably has link members 132 and 134 that are pivotably connected at pin 136.

In operation, this embodiment operates in a similar manner to that previously described. The primary difference is that as the buffer mechanism 20 moves from position A to variable position B, the top surface 26 of the main conveyor is lengthened creating a first buffer zone, while the second buffer zone remains on the top surface 42 of indexing belt 40.

From this disclosure, an apparatus and a method of loading food articles has been shown that optimizes the processing rate through a variable position B, reduces the possibility of product damage, and provides a linkage system that is less susceptible to breakage. Thus, at least all of the stated objectives have been met.

What is claimed is:

1. A loading apparatus comprising:
   a main conveyor configured to convey a plurality of food articles at a continuous speed;
   an indexing conveyor configured to operate in an intermittent motion as the main conveyor simultaneously operates at the continuous speed;
   a transfer member configured to transfer the food articles from the main conveyor to the indexing conveyor; and
   a buffer mechanism associated with the transfer member, the buffer mechanism configured to change the position of the transfer member relative to at least one of the main conveyor and the indexing conveyor to permit the food articles to be transferred by the transfer member from the main conveyor to the indexing conveyor while the main conveyor operates at the continuous speed and the transfer member simultaneously operates in the intermittent motion.

2. The loading apparatus of claim 1, wherein the buffer mechanism is configured to move the transfer member between first and second positions.

3. The loading apparatus of claim 2, wherein the buffer mechanism is operable to oscillate the transfer member linearly between the first and second positions.

4. The loading apparatus of claim 1, wherein the transfer member comprises a rotatable transfer wheel.

5. The loading apparatus of claim 1, further comprising a pusher mechanism configured to transfer the food articles from the indexing conveyor to a packaging machine in predetermined-sized groups.

6. The loading apparatus of claim 1, wherein the indexing conveyor is located beneath the main conveyor.

7. The loading apparatus of claim 1, wherein the buffer mechanism is operable to create a variable buffer zone of the food articles.

8. A loading apparatus comprising:
   a main conveyor configured to convey a plurality of food articles at a continuous speed;
   an indexing conveyor configured to travel at speeds above and below a speed that is synchronous with the continuous speed of the main conveyor, wherein operation of the indexing conveyor at the speeds above and below the synchronous speed causes the indexing conveyor to travel in an intermittent motion as the main conveyor simultaneously operates at the continuous speed;
   a transfer member configured to transfer the food articles from the main conveyor to the indexing conveyor; and
   a buffer mechanism associated with the transfer member, the buffer mechanism configured to change the position of the transfer member relative to at least one of the main conveyor and the indexing conveyor to permit the food articles to be transferred by the transfer member from the main conveyor to the indexing conveyor while the main conveyor operates at the continuous speed and the transfer member simultaneously operates in the intermittent motion.

9. The loading apparatus of claim 8, wherein the buffer mechanism is configured to move the transfer member in a first direction when the indexing conveyor operates below the synchronous speed and in a second direction when the indexing conveyor operates above the synchronous speed.

10. The loading apparatus of claim 8, wherein the buffer mechanism is configured to move the transfer member between first and second positions.

11. The loading apparatus of claim 10, wherein the buffer mechanism is operable to oscillate the transfer member linearly between the first and second positions.

12. The loading apparatus of claim 8, wherein the transfer member comprises a rotatable transfer wheel.

13. The loading apparatus of claim 8, further comprising a pusher mechanism configured to transfer the food articles from the indexing conveyor to a packaging machine in predetermined-sized groups.

14. The loading apparatus of claim 8, wherein the indexing conveyor is located beneath the main conveyor.

15. The loading apparatus of claim 8, wherein the buffer mechanism is operable to create a variable buffer zone of the food articles.

16. A method of loading food articles, comprising:
conveying a plurality of food articles with a main conveyor at a continuous speed;
operating an indexing conveyor at speeds above and below a speed that is synchronous with the continuous speed of the main conveyor, wherein operation of the indexing conveyor at the speeds above and below the synchronous speed causes the indexing conveyor to travel in an intermittent motion as the main conveyor simultaneously operates at the continuous speed;
changing the position of a transfer member relative to at least one of the main conveyor and the indexing conveyer to permit the food articles to be transferred by the transfer member from the main conveyor to the indexing conveyor while the main conveyor operates at the continuous speed and the transfer member simultaneously operates in the intermittent motion.

17. The method of claim 16, wherein said changing of the position of the transfer member comprises moving the transfer member in a first direction when the indexing conveyor operates below the synchronous speed and moving the transfer member in a second direction when the indexing conveyor operates above the synchronous speed.

18. The method of claim 16, wherein said changing of the position of the transfer member comprises oscillating the transfer member linearly between first and second positions.

19. The method of claim 16, further comprising pushing the food articles from the indexing conveyor to a packaging machine in predetermined-sized groups.

20. The method of claim 16, further comprising creating a variable buffer zone of the food articles.

\* \* \* \* \*